United States Patent [19]
Dohrendorf

[11] 3,972,091
[45] Aug. 3, 1976

[54] DEVICE FOR SEVERING THE HEADS OF FISHES

[75] Inventor: Franz Dohrendorf, Lubeck, Germany

[73] Assignee: Nordischer Maschinenbau Rud. Baader, Lubeck, Germany

[22] Filed: Feb. 24, 1975

[21] Appl. No.: 552,637

Related U.S. Application Data

[62] Division of Ser. No. 241,512, April 6, 1972, Pat. No. 3,885,270.

[52] U.S. Cl. ........................................ 17/55; 17/57
[51] Int. Cl.² ...................................... A22C 25/00
[58] Field of Search ............. 17/55, 57, 56, 60, 59, 17/63, 54, 45

[56] References Cited
UNITED STATES PATENTS
3,680,174    8/1972    Dohrendorf ........................ 17/55

*Primary Examiner*—Robert Peshock
*Attorney, Agent, or Firm*—Edward F. Levy

[57] ABSTRACT

In severing the heads of fishes by a wedge-shaped cut, after their gill cavity and abdominal cavity have been opened, and after they have been gutted, the head of the fish is aligned and secured in position and, after the beheading cut has been accomplished, the parts containing the collar bones are separated from the head by guided cuts into the gill cavity whereupon the separated parts with the collar bones may be conveyed to be further processed in a well known manner to separate the meat from the bones. The device for carrying this method into effect comprises a machine frame carrying an intermittently advanced conveyor having receiving means for the fishes mounted thereon. A head severing device is mounted on the machine frame laterally of the conveyor and includes a pair of circular knives arranged angularly with respect to each other, said circular knives being mounted for pivoting motions transversely relative to the path of movement of the fish about an axis extending in parallel relation to the path of movement of the conveyor. Downstream of the head severing device, spaced therefrom about the distance between two adjacent receiving means, a device for separating the meat parts containing the collar bones from the head is mounted on the machine frame which separating device includes a pair of circular knives arranged in a common plane with their adjacent cutting edges spaced equally from the vertical plane of symmetry of the receiving means when the conveyor is stopped so as to form a gap therebetween and mounted for pivoting motions through the path of movement of the receiving means.

6 Claims, 7 Drawing Figures

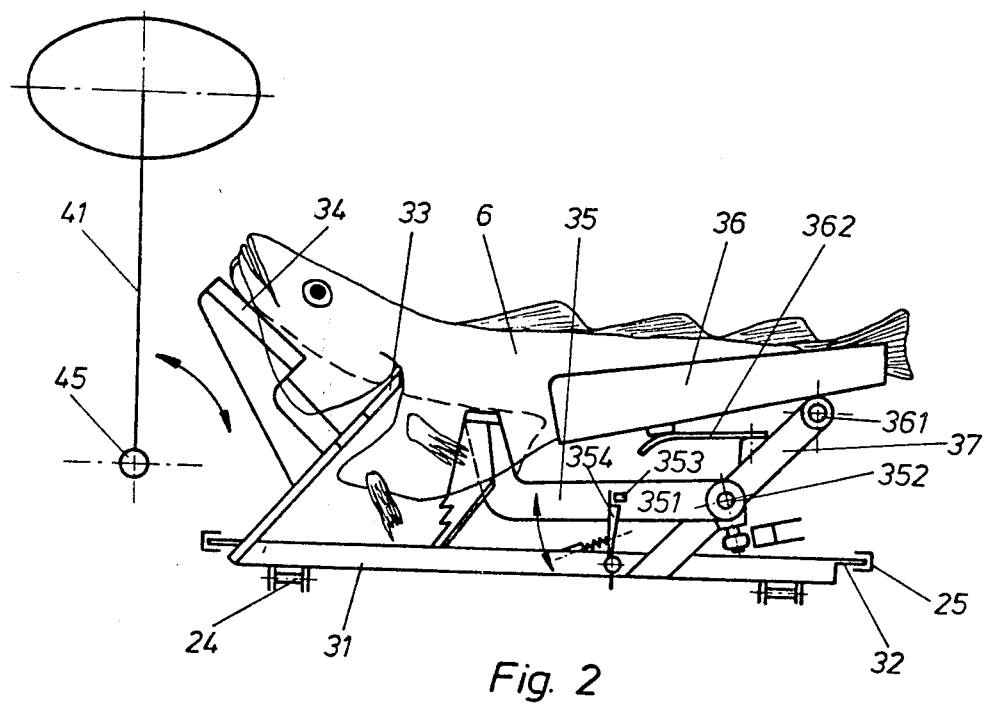
Fig. 2
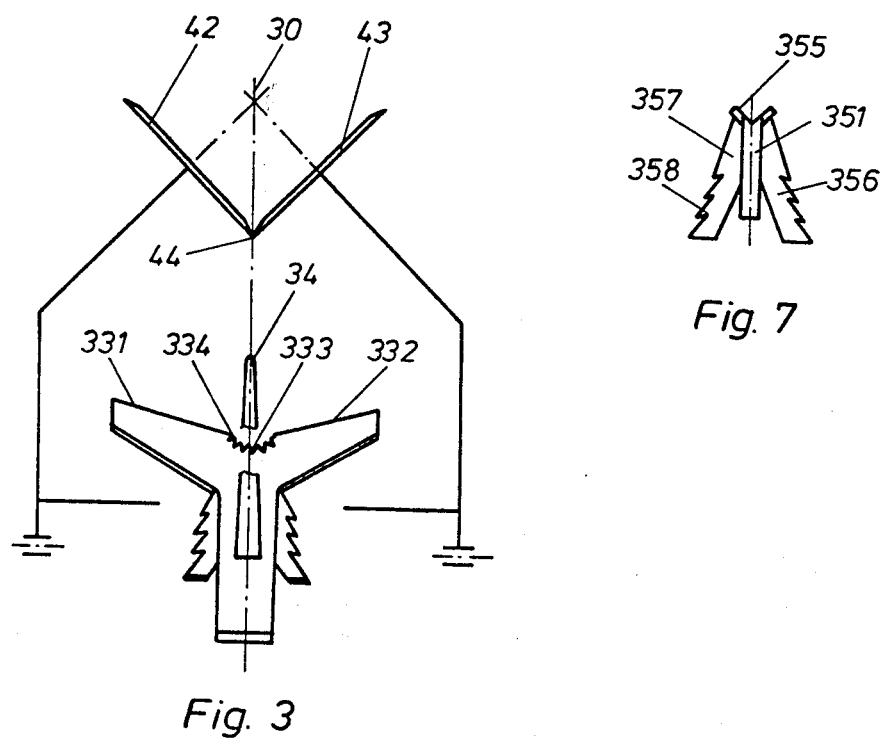
Fig. 3
Fig. 7

3,972,091

DEVICE FOR SEVERING THE HEADS OF FISHES

This application is a division of application Ser. No. 241,512, filed Apr. 6, 1972, and now U.S. Pat. No. 3,885,270, issued May 27, 1975.

BACKGROUND OF THE INVENTION

1. Description of the Prior Art

According to a known method (see Norwegian Patent Application 916/69) the collar bones of a fish, of which the head has been severed by a circular cut, and which is advanced with its tail and leading, while its belly lobes slide along a pair of inclined surfaces, are severed from the body of the fish by a pair of rotating circular knives being spaced relative to each other and moving from the neck side transversely to the path of movement of the fish. This method is afflicted with the drawback that, due to the longitudinal advance of the fish the parts containing the collar bones are not cut-off with the accuracy as may be achieved when the head of the fish is severed by a wedge-shaped cut. The loss of valuable fish meat is considerable in this known method.

It is an object of this invention to provide a method and a device for cutting-off the head, the collar bones, the pectoral and the ventral fins from the body of a fish with a minimum loss of fish meat by gaining the parts containing the collar bones.

Another object of the invention is to provide a method and a device in which the parts containing the collar bones can be gained for separating from them the meat without manual handling According to the invention the method includes the following steps:
 a. aligning the head of each fish and securing it in position;
 b. severing said head by a wedge-shaped cut behind the collar bones;
 c. separating the parts containing the collar bones from the head by cuts extending into the gill cavity;
 d. removing said parts containing the collar bones and the head as well as the body of the fish to be processed further.

Remarkable advantages are achieved in using the method according to the invention for fishes of which the gill and abdominal cavities have been opened wherein the head of each fish is fixed in position by straddling the gill cavity and supporting the head between the arc of the lower jaw, whereupon the body of the fish is cut-off and the parts containing the collar bones are separated from the head by cuts directed downwardly from the neck.

Advantageously the straddling support operation of each fish in its gill cavity is accompanied by aligning the fish in its transverse position and supporting it at the lower jaw in an even level, and wherein the body of the fish is centered with respect to its height and its lateral position by supporting the lower side of its vertebral column prior to the head severing operation.

A preferred method according to the invention for severing the heads of fishes after their gill and abdominal cavities have been opened and they have been gutted, comprises the following steps:
 a. aligning the part of the body of each fish behind its head in longitudinal direction along its plane of symmetry in an even level by resiliently engaging its vertebral column;
 b. aligning the head of the fish and securing it in position by straddling the gill cavity and supporting the head between the arc of the lower jaw;
 c. severing the head of the fish from the body by a wedge-shaped downwardly directed cut;
 d. separating the parts containing the collar bones from the head by downwardly directed cuts extending into the gill cavity;
 e. removing the parts containing the collar bones and the head as well as the body of the fish to be processed further.

The device for carrying this preferred method into effect comprises an intermittently advanced endless conveyor including receiving means for the fishes and a head severing device with a pair of angularly arranged circular knives movable transversely relative to the path of movement of the fish, wherein the pair of circular knives are arranged with their nearly contacting cutting edges in the plane of symmetry of said receiving means and are mounted for pivoting motions about an axis extending in parallel relation to the path of movement of said conveyor, wherein a separating device comprises a pair of circular knives arranged in a common plane with their adjacent cutting edges defining a gap therebetween said separating device being mounted for pivoting motions through the path of movement of said receiving means and being arranged downstream of said beheading device spaced therefrom about the spacing between adjacent receiving means, and wherein further each receiving means comprises a support engaging the gill cavity supporting the fish and including a pair of supporting edges forming a top open "V" which include an angle of approximately 150° and a head support adjacent said support, a vertically movable belly support lockable in its raised position and including a pair of wings arranged in V-shape and diverging with their outer edges in a roof gable-like manner downwardly, and a pivotal U-shaped top open trough.

This device may advantageously be provided with a substantially circular aperture at the apex of the pair of supporting edges of said support serving to receive the vertebral spine of the fish into which aperture a plurality of teeth project.

The outer edges of the belly support wings may advantageously be provided with downwardly directed saw teeth both wings carrying in unison a groove-like support surface.

The preferred embodiment of the device according to the invention comprises an intermittently advanced endless conveyor including receiving means for the fishes and a head severing device with a pair of angularly arranged circular knives movable transversely relative to the path of movement of the fish, wherein the pair of circular knives are arranged with their nearly contacting cutting edges in the plane of symmetry of said receiving means and are mounted for pivoting motions about an axis extending in parallel relation to the path of movement of said conveyor, wherein a separating device is provided comprising a pair of circular knives arranged in a common plane with their adjacent cutting edges defining a gap therebetween said separating device being mounted for pivoting motions through the path of movement of said receiving means and being arranged downstream of said beheading device spaced therefrom about the spacing between adjacent receiving means, and wherein further each receiving means comprises a support engaging the gill cavity supporting the fish and including a pair of supporting edges forming a top open "V" which include an angle of approximately 150° and a head support adjacent said support, a vertically movable belly support lockable in its raised position and including a pair of wings arranged in V-shape and diverging with their outer edges in a roof gable-like manner downwardly, and a pivotal U-shaped top open trough, wherein a substantially circular aperture is provided at the apex of the pair of supporting edges of said support serving to receive the vertebral spine of the fish into which aperture a plurality of teeth project, wherein the outer edges of said belly support wings are provided with downwardly directed saw teeth both wings carrying in unison a groove-like support surface, and wherein said conveyor is advanced intermittently by drive means in a known per se manner said drive means simultaneously controlling the movements of said head severing device and said separating device during the stopping periods of said conveyor.

Without any limitation of its scope the invention shall now be described in detail in connection with the attached drawings showing schematically an exemplified preferred embodiment of the device with which the method according to the invention may be carried into effect.

BRIEF DESCRIPTION OF THE DRAWINGS

FIG. 2 is a cross sectional view through the device including a side view of receiving means supporting a fish;

FIG. 3 is a front view of FIG. 2 viewed from the zone of the head severing device with the fish omitted;

FIG. 7 is a front view corresponding to FIG. 3 looking upon the belly support, however, with the fish omitted.

DESCRIPTION OF THE PREFERRED EMBODIMENT

Figure 1:
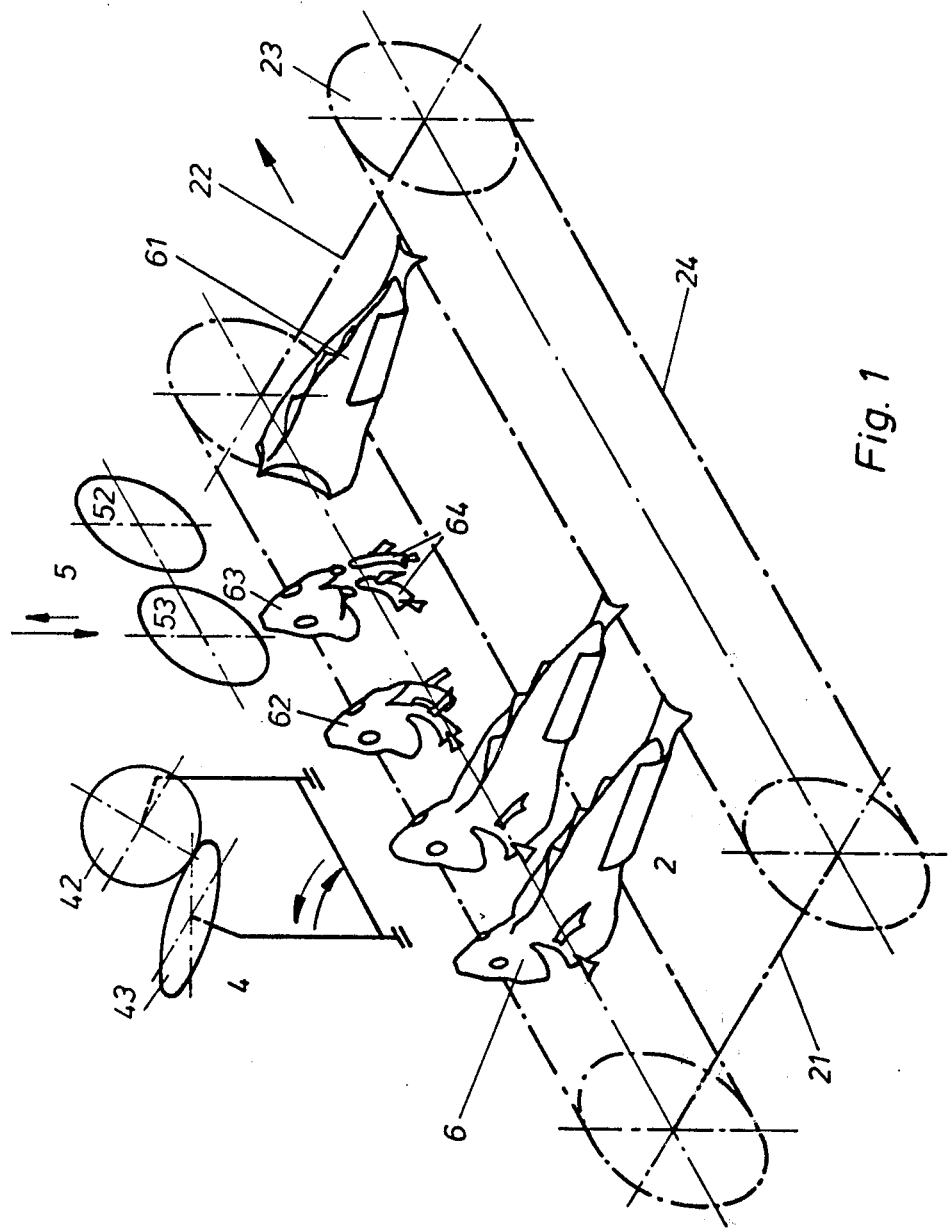
FIG. 1 is a perspective total view of a device according to the invention.
Figure 6:
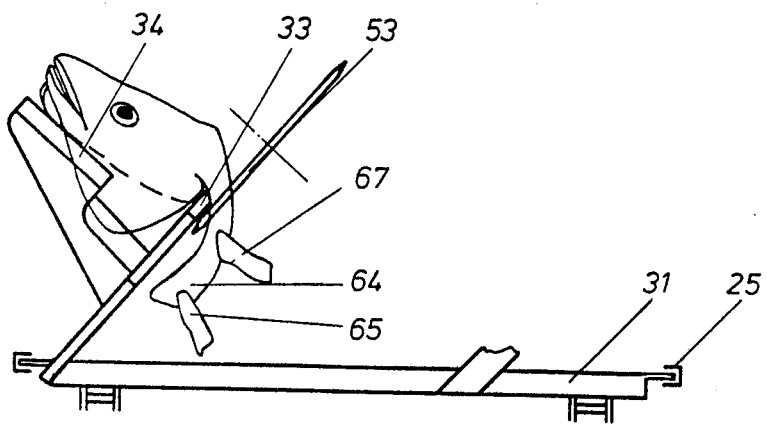
FIG. 6 is a partial side view according to FIG. 2 at the location of the separating device.
Figure 4:
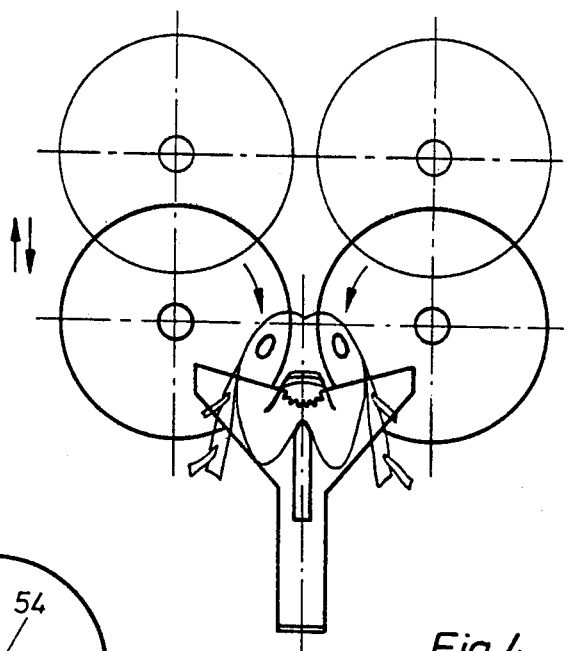
FIG. 4 is a front view corresponding to FIG. 3 at the location of the separating device viewed from the left hand side with the head of the fish shown.
Figure 5:
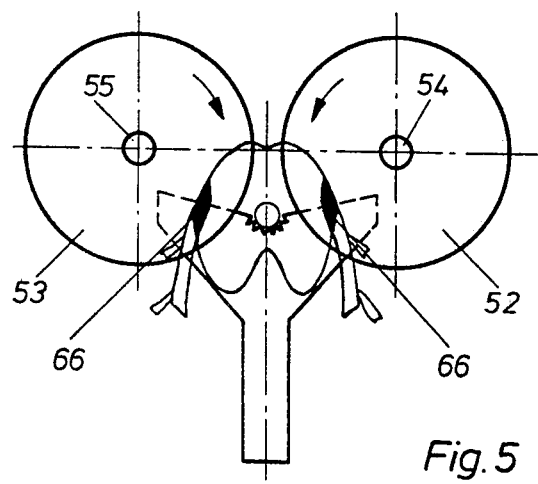
FIG. 5 is a front view corresponding to FIG. 4 seen from the right hand side.

In a not illustrated machine frame a shaft 21 is rotatably supported at the charging end and a shaft 22 at the discharge end, of which shafts, at least one, is driven in a suitable manner, for example by an electro motor via a reduction gearing. Chains 24 extending around sprocket wheels 23 mounted on both shafts 21 and 22 are formed together with receiving means 3 for the fishes a conveyor 2 moving intermittently in the direction indicated by the arrow. The intermittent advance may, for example, be achieved in a simple manner by a Geneva wheel drive. Each of the receiving means 3, which are arranged in equal spacings on the conveyor 2, consists of a carrier 31 guided with skids 32 in stationary guide rails 25 mounted on the frame. Adjacent its left hand end a support 33 is mounted on the carrier 31, inclined by approximately 45°, and fixed thereto is a head support 34. A trough 36 supported by a leaf spring 362 is pivotally journalled for pivoting movements about another axis 352 and is held in its raised position by an abutment 353 engaging a spring loaded pawl 354. The release means for the pawl allowing to lower the arm 351 has not been illustrated; a cam follower roll and a cam for raising the arm have been shown.

At its free upwardly bent end the arm 351 carries a pair of wings 356, 357 arranged in V-shape relation to each other the outer edges extending in form of a roof gable downwardly diverging and being provided with downwardly directed saw teeth 358. At their upper edges the arm 351 and the pair of wings 356, 357 both carry commonly a groovelike support surface 355.

At its upper end the support 33 is provided with an upwardly open V-shaped aperture formed by two supporting edges 331, 332 including an angle of approximately 150°. At the apex of these two supporting edges a substantially circular aperture 333 is provided into which a plurality of teeth 334 project. A head severing device 4 includes a pair of circular knives 42, 43 arranged to include an obtuse angle with their cutting edges almost contacting each other. The circular knives 42, 43 are arranged on a knife carrier 41 pivotal about an axis 45, and driven in any suitable manner.

A separating device 5 may also be constructed in a manner similar to the head severing device 4, and may pivot about a stationary axis. The separating device 5 comprises a pair of circular knives 52, 53 arranged in a common plane so as to form a gap between them and driven in opposite directions. However, the separating device 5 may also be arranged to move in vertical direction in parallel relation to the plane of movement of the support 33.

The locations of the head severing device 4 and of the separating device 5 are also chosen in such a manner that their centers are disposed in the plane of symmetry of each receiving means 3 when it comes to a stop in front thereof. The drives of the severing device 4 and of the separating device 5 are controlled in such a manner that each of them performs a downward and an upward stroke during the stopping period of the receiving means 3.

In the four stop stations shown in FIG. 1 the bodies of the fishes and also the troughs 36 have been omitted for reasons of clarity.

The mode of operation of the device is as follows:

A fish 6 having its gill and its abdominal cavities opened and being gutted is placed with the tail end part of its body into the trough 36 supported with its gill cavity on the support 33, wherein the lower part of the vertebra is received in the aperture 333 while the arc of the lower jaw of the fish is positioned on both sides of the head support 34. During the advance movement of the conveyor to the next station the positively actuated belly support 35 pivots upwardly and enters the spread-open abdominal cavity, thereby lifting the vertebral column of the fish with its support surface 355 to an even level, wherein the vertebral column is centered with respect to its lateral position. In the next station the body of the fish is cut-off by the pair of circular knives 42, 43 from the head 62 which is straddling the support 33 while in the next following station the two parts 64 containing the collar bones are separated from the head by the pair of circular knives 52, 53.

However, it is to be understood that the device may also be used solely to cut-off the body of the fish from its head. In this case it represents a head severing device which, for fishes having their gill and abdominal cavities opened and have been gutted, enable a yield of meat like no known device.

Summing up the method and device according to the invention the main advantages may be seen in the fact that fishes, with opened gill cavities as well as with separated ends of the collar bones as in a state of rigidity of death may be beheaded in an economical manner by a wedge-shaped cut and that the parts containing the collar bones may safely be removed from the head of the fish without manual handling.

What is claimed is:

1. A device for processing the heads of gutted fish comprising an intermittently advanced endless conveyor including receiving means for retaining the fish belly-side-down with their length disposed perpendicularly to the path of travel of said conveyor, a head severing device comprising a pair of circular knives arranged angularly to each other and having at one side closely-spaced, adjacent cutting edges located in the plane of symmetry of said receiving means, and means for moving said knives transversely relative to the path of movement of said fish, a separating device for separating the collar bones from the head of the fish, said separating device comprising a pair of circular knives cooperating with each other and having adjacent cutting edges, said separating device being positioned downstream of said head separating device and spaced therefrom by a distance approximately equal to the spacing between adjacent receiving means, means mounting said separating device for pivotal movement through the path of movement of said receiving means, each receiving means comprising a support engaging the gill cavity of the fish supported thereon and including a pair of supporting edges arranged in V-shape, a head support adjacent said support, a belly support, and a U-shaped open-top trough.

2. A device according to claim 1 in which the pair of supporting edges of said receiving means form an included angle of approximately 150°.

3. A device according to claim 1 in which said belly support includes a pair of wings arranged in a V-shape and diverging with their outer edges in gabled arrangement, said belly support being mounted for vertical movement and including means for locking said belly support in raised position.

4. A device according to claim 1 in which the said support is formed with a substantially circular aperture at the apex of said pair of supporting edges for supporting the vertebral spine of the fish, and a plurality of teeth in said aperture.

5. A device according to claim 3 in which the outer edges of said belly support wings are provided with downwardly-directed saw teeth, said wings also forming a groove-like support surface.

6. A device for processing the heads of gutted fish comprising an intermittently advanced endless conveyor including receiving means for retaining the fish with their length disposed perpendicularly to the path of travel of said conveyor, a head severing device comprising a pair of circular knives arranged angularly to each other and having closely-spaced cutting edges located in the plane of said receiving means, said circular knives being mounted for pivoted movement about an axis extending parallel to the path of movement of said conveyor, a separating device comprising a pair of circular knives arranged in a common plane and having adjacent cutting edges defining a gap therebetween, said separating device being located downstream of said head severing device and being spaced therefrom by a distance approximately equal to the spacing between adjacent receiving means, each receiving means comprising a support engaging the gill cavity of the fish supported thereon, and including a pair of supporting edges arranged in V-shape and forming an included angle of approximately 150°, a head support adjacent said support, a vertically-movable belly support including a pair of wings arranged in inverted V-shape and a pivotally-mounted top-open trough, said support being formed with a substantially circular aperture at the apex of said pair of supporting edges for supporting the vertebral spine of said fish, and a plurality of teeth in said aperture, the outer edges of said belly support wings being provided with downwardly-directed saw teeth and forming a groove-like support surface, and drive means for advancing said conveyor intermittently and for simultaneously controlling the movements of said head severing device and said separating device during the stopping periods of said conveyor.

* * * * *